United States Patent Office 2,812,348
Patented Nov. 5, 1957

2,812,348

N-ALKYL-N-BENZHYDRYLAMINOALKYL ESTERS OF N,N-DIALKYLAMINOALKANOIC ACIDS, THEIR SALTS AND THE PRODUCTION THEREOF

Kurt J. Rorig, Evanston, Ill., assignor, by mesne assignments, to G. D. Searle & Co., Skokie, Ill., a corporation of Delaware No Drawing. Application August 12, 1954,
Serial No. 449,495

8 Claims. (Cl. 260—482)

My present invention relates to basic esters of dialkyl substituted amino acids and, more particularly, to N-alkyl-N-benzhydrylaminoalkyl esters of N,N-dialkylaminoalkanoic acids, their salts and the production thereof.

The compounds which constitute my invention can be represented by the general basic formula

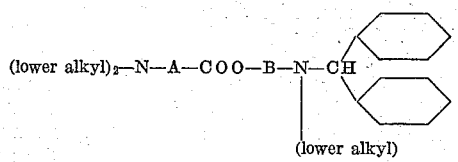

wherein A is a lower alkylene radical and B is a lower alkylene radical separating the carboxy group and the nitrogen atom attached thereto by at least two carbon atoms.

In the foregoing structural formula the three lower alkyl groups can be methyl, ethyl, straight-chained and branched propyl, butyl, amyl and hexyl groups. The radical A is a lower alkylene radical derived from a lower bivalent aliphatic hydrocarbon radical such as methylene, ethylene, propylene, butylene, amylene, hexylene or a polymethylene radical such as trimethylene, tetramethylene, pentamethylene, hexamethylene, and the like. The radical B is of the same type except that at least two carbon atoms must separate the carboxy and the benzhydrylamino radical; this excludes the methylene radical.

The compounds of my invention are valuable as intermediates in organic synthesis. They are also valuable as medicinal agents and, particularly, as cardio-regulatory and hypotensive agents and as specific musculotropic spasmolytics. They have a powerful papaverine-like action. The quaternary ammonium salts are active ganglion blocking agents.

The bases described above form salts which are non-toxic in therapeutic dosage with a variety of inorganic and strong organic acids such as phosphoric, hydrochloric, hydrobromic, hydriodic, sulfamic, acetic, maleic, malic, succinic, tartaric, citric, ascorbic, gluconic, benzoic, cinnamic, and related acids. They also form quaternary ammonium salts with a variety of organic esters of sulfuric, hydrohalic, and aromatic sulfonic acids. Among such esters are methyl chloride, bromide and iodide; the ethyl halides, propyl halides, butyl halides, isobutyl halides, benzyl halides, phenethyl halides, naphthylmethyl halides, dimethyl sulfate, methyl benzenesulfonate, ethyl toluenesulfonate, ethylene chlorohydrin, ethylene bromohydrin, the propylene halohydrins, allyl chloride, methallyl bromide and crotyl bromide.

My invention will be described in further detail by the following examples. However, these examples are not to be construed as limiting it in spirit or in scope. In these examples quantities of materials are indicated in parts by weight and pressures in millimeters (mm.) of mercury.

Example 1

A mixture of 741 parts of diphenylbromomethane, 450 parts of N-methyl-β-hydroxyethylamine, 1600 parts of butanone, and 5 parts of sodium iodide is stirred for 2 hours and then concentrated under vacuum on a steam bath. The residue is rendered alkaline by addition of aqueous potassium carbonate and extracted with ether. This extract is washed with water, dried over anhydrous calcium sulfate, filtered and evaporated. The residue is distilled at 0.5 mm. pressure to yield N-(β-hydroxyethyl)-N-methylbenzhydrylamine at 142–143° C.

A solution of 48 parts of N-(β-hydroxyethyl)-N-methylbenzhydrylamine in 88 parts of anhydrous thiophene-free benzene is treated with 22.4 parts of chloroacetyl chloride under ice cooling. After subsidence of the initial exothermic reaction, the mixture is refluxed for 10 minutes and cooled. The precipitate is collected on a filter and dried. Crystallized from ethanol, the hydrochloride of the chloroacetate of N-(β-hydroxyethyl)-N-methylbenzhydrylamine is obtained which melts at about 191–194° C.

Into a solution of 18 parts of the chloroacetate of N-(β-hydroxyethyl)-N-methylbenzhydrylamine (liberated by alkalinization of the hydrochloride and ether extraction) in 50 parts of butanone, 6 parts of gaseous dimethylamine are introduced. The mixture is then heated for 4 hours at 70° C. and permitted to stand at room temperature. After evaporation of the butanone the residue is dissolved in dilute hydrochloric acid, washed with ether, rendered alkaline by addition of potassium carbonate and extracted with ether. This extract is dried over anhydrous potassium carbonate, filtered and evaporated and the residue is distilled at 170–190° C. and 0.8–1.2 mm. pressure.

Treatment of this oil with alcoholic hydrogen chloride yields the water soluble dihydrochloride melting at about 234–235° C. This salt has the structural formula

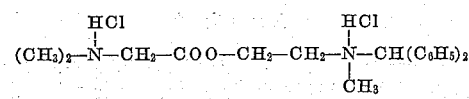

Example 2

The hydrochloride of the chloroacetate of N-(β-hydroxyethyl)-N-methylbenzhydrylamine is dissolved in water and the solution is rendered alkaline by addition of potassium carbonate and extracted with ether. The free base is obtained by evaporation of the ether. 36 parts of this base are dissolved in 100 parts of butanone and treated with 18 parts of diethylamine. After further addition of 0.1 part of sodium iodide, the mixture is heated in a sealed pressure reactor for 5 hours at 70° C. and then permitted to stand at room temperature for several days. After evaporation of the butanone, the residue is taken up in dilute hydrochloric acid, washed with ether, rendered alkaline by addition of sodium carbonate and extracted with ether. This extract is dried over anhydrous potassium carbonate, filtered and evaporated to yield the N-methyl-N-benzhydrylaminoethyl ester of the N,N-diethylaminoacetic acid which is distilled at about 180–190° C. and 0.7 mm. pressure. The compound has the structural formula

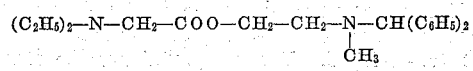

Example 3

A mixture of 494 parts of diphenylbromomethane, 356 parts of N-ethyl-β-hydroxyethylamine and 1000 parts of butanone is stirred for 4 hours, filtered and concentrated on a steam bath. The residue is made alkaline by addition of potassium carbonate and extracted with ether. The ether solution is dried over anhydrous potassium carbonate, filtered and evaporated to yield N-(β-hydroxyethyl)-N-ethylbenzhydrylamine which is distilled at about 157–165° C. and 0.7 mm. pressure.

To a solution of 102 parts of N-(β-hydroxyethyl)-N-ethylbenzhydrylamine in 175 parts of anhydrous thiophene-free benzene there is added, in the course of 5 minutes, a solution of 44.8 parts of chloroacetyl chloride in 45 parts of benzene. After subsidence of the initial exothermic reaction, the mixture is refluxed for 40 minutes, permitted to stand at room temperature for 5 hours, diluted with water, and rendered alkaline by addition of potassium hydroxide. The organic layer is extracted with ether and the extract is dried over anhydrous potassium carbonate, decolorized with charcoal, filtered and concentrated to an oil containing the chloroacetate of N-(β-hydroxyethyl)-N-ethylbenzhydrylamine. The hydrochloride obtained therefrom by treatment with alcoholic hydrogen chloride melts at about 185–187° C. on crystallization from a mixture of ethanol and ether.

In a shielded pressure reactor a mixture of 45 parts of the foregoing basic chloroacetate, 20.4 parts of diethylamine, 21 parts of sodium iodide and 120 parts of butanone is heated for 5 hours at 83° C., cooled and freed from solvent by evaporation. The residue is taken up in water, made acid by addition of dilute hydrochloric acid, washed with ether, rendered alkaline by addition of aqueous sodium hydroxide and extracted with ether. This extract is dried over anhydrous potassium carbonate, filtered and evaporated to yield an oily residue. Upon distillation at 0.15 mm. pressure, the N-ethyl-N-benzhydrylaminoethyl ester of N,N-diethylaminoacetic acid is collected at 158–161° C. The compound has the structural formula (C₂H₅)₂—N—CH₂—COO—CH₂—CH₂—N—CH(C₆H₅)₂
                                    |
                                    C₂H₅

Example 4

A mixture of 18.43 parts of N-ethyl-N-benzhydrylaminoethyl ester of N,N-diethylaminoacetic acid, 7.1 parts of iodomethane and 80 parts of butanone is heated at 80° C. for 4 hours in a sealed pressure reactor, cooled and permitted to stand under 150 parts of ether at 0° C. until a precipitate forms. The methiodide is thus obtained in dense white needles which melt at about 149–150° C.

Example 5

In a pressure reactor a mixture of 45 parts of the chloroacetate of N-(β-hydroxyethyl)-N-ethylbenzhydrylamine, 28.4 parts of diisopropylamine, 21 parts of sodium iodide and 120 parts of butanone is heated at 80° C. for 5 hours, chilled and freed from butanone by distillation. The residue is taken up in water, rendered acid by addition of dilute hydrochloric acid, washed with benzene, rendered alkaline by addition of concentrated aqueous sodium hydroxide solution and extracted with ether. The ether extract is dried over anhydrous potassium carbonate, filtered and evaporated. Distillation of the oily residue at 0.15 mm. pressure yields the N-ethyl-N-benzhydrylaminoethyl ester of N,N-diisopropylaminoacetic acid at about 165–173° C. The compound has the structural formula

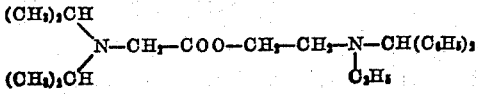

Example 6

In the course of 2 hours a solution of 50 parts of diphenylbromomethane in 20 parts of toluene is added portion-wise to a refluxing solution of 52 parts of N-n-butyl-γ-hydroxypropylamine in 20 parts of toluene. Refluxing is continued for 4 hours, after which the reaction mixture is chilled and the resulting precipitate is washed on a filter with ether. The combined filtrates are dried over anhydrous potassium carbonate, filtered and evaporated to yield N-(γ-hydroxpropyl)-N-n-butylbenzhydrylamine.

In the course of 5 minutes a solution of 154 parts of γ-chlorobutyryl chloride in 120 parts of benzene is added to a solution of 255 parts of N-(γ-hydroxypropyl)-N-n-butylbenzhydrylamine in 500 parts of benzene under reflux. Refluxing is continued for 40 minutes, after which water is added. The mixture is rendered alkaline by addition of dilute potassium hydroxide and then extracted with ether. This extract is dried over anhydrous calcium sulfate, stirred with charcoal, filtered and evaporated to yield the γ-chlorobutyrate of N-(γ-hydroxypropyl)-N-n-butylbenzhydrylamine as a light yellow oil.

A solution of 11.4 parts of this ester in 30 parts of butanone is treated with 3 parts of gaseous dimethylamine and 0.1 part of sodium iodide. The mixture is heated at 70° C. for 5 hours, cooled and freed from butanone by evaporation. The residue is absorbed in dilute hydrochloric acid, washed with ether, rendered alkaline by addition of dilute potassium carbonate and extracted with ether. This extract is dried over anhydrous calcium sulfate, filtered and evaporated and the residue is distilled at about 170–175° C. and 0.1 mm. pressure to yield the N-butyl-N-benzhydrylaminopropyl ester of N,N-dimethylaminobutyric acid. This compound has the structural formula (CH₃)₂—N—CH₂—CH₂—CH₂—COO—CH₂—CH₂—CH₂—N—CH(C₆H₅)₂
                                                            |
                                                            CH₂—CH₂—CH₂—CH₃

Example 7

A mixture of 19.8 parts of N-ethyl-N-benzhydrylaminoethylester of N,N-diisopropylaminoacetic acid, 7.1 parts of iodomethane and 80 parts of butanone is heated to 80° C. for 3 hours in a sealed pressure reactor, cooled and permitted to stand under 80 parts of ether until a precipitate forms. The methiodide is thus obtained in dense white needles which melt at about 137–139° C. after recrystallization from butanone and ether.

I claim:

1. A compound of the structural formula (lower alkyl)₂—N—A—COO—B—N—CH(C₆H₅)₂
                              |
                              (lower alkyl)

wherein A is a lower alkylene radical and B is a lower alkylene radical separating the carboxy group and the nitrogen atom attached thereto by at least two carbon atoms.

2. A compound of the structural formula (lower alkyl)₂—N—CH₂—COO—B—N—CH(C₆H₅)₂
                              |
                              (lower alkyl)

wherein B is a lower alkylene radical separating the carboxy group and the nitrogen atom attached thereto by at least two carbon atoms.

3. A compound of the structural formula (lower alkyl)₂—N—CH₂—COO—CH₂—CH₂—N—CH(C₆H₅)₂
                                        |
                                        CH₃

4.
(CH₃)₂N—CH₂—COO—CH₂—CH₂—N—CH(C₆H₅)₂
                              |
                              CH₃

5.
(C₂H₅)₂N—CH₂—COO—CH₂—CH₂—N—CH(C₆H₅)₂
                              |
                              CH₃

6. A compound of the structural formula
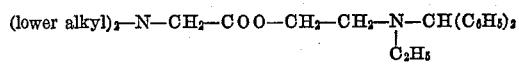
7.
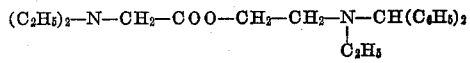
8.
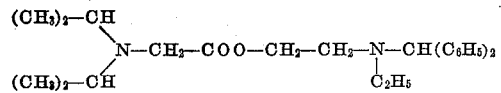
References Cited in the file of this patent
UNITED STATES PATENTS
2,490,834  Rieveschl et al. _____ Dec. 13, 1949
2,625,547  Lawson et al. _____ Jan. 13, 1953